(12) United States Patent
Looney et al.

(10) Patent No.: US 6,367,190 B1
(45) Date of Patent: Apr. 9, 2002

(54) FLY HARNESSING AND STORAGE DEVICE

(75) Inventors: Michael B. Looney, Lebanon, NJ (US); Eugene C. Looney, Lutherville, MD (US)

(73) Assignee: Loontackle, Inc., Lebanon, NJ (US)

( * ) Notice: Subject to any disclaimer, the term of this patent is extended or adjusted under 35 U.S.C. 154(b) by 0 days.

(21) Appl. No.: 09/585,047

(22) Filed: Jun. 1, 2000

(51) Int. Cl.[7] ............................................. A01K 97/06
(52) U.S. Cl. ...................................................... 43/57.1
(58) Field of Search .............................. 43/57.1, 43.11, 43/57.2

(56) References Cited

U.S. PATENT DOCUMENTS

| | | | | |
|---|---|---|---|---|
| 228,511 A | * | 1/1880 | Bray ........................... | 43/57.1 |
| 667,676 A | | 2/1901 | Cantrell | |
| 786,352 A | * | 4/1905 | Frost ........................... | 43/57.1 |
| 940,132 A | | 11/1909 | Creasey | |
| 1,900,035 A | | 3/1933 | Beck | |
| 2,525,057 A | | 10/1950 | Anderson ..................... | 43/57.5 |
| 2,530,292 A | * | 11/1950 | Crook ........................... | 43/57.1 |
| 2,540,340 A | | 2/1951 | Linblade ..................... | 43/57.5 |
| 3,638,843 A | | 2/1972 | Ortynski ..................... | 224/5 G |
| 3,832,798 A | | 9/1974 | Pilston ........................ | 43/57.5 |
| 4,389,806 A | * | 6/1983 | Herring ....................... | 43/57.1 |
| 4,437,258 A | | 3/1984 | Allard .......................... | 43/57.1 |
| 4,516,707 A | | 5/1985 | Crapanzano ................. | 224/202 |
| 4,528,772 A | * | 7/1985 | Schaefers .................... | 43/54.1 |
| 4,563,834 A | | 1/1986 | Spencer ....................... | 43/57.1 |
| 5,337,511 A | | 8/1994 | Ashbaugh .................... | 43/57.1 |
| 5,761,845 A | | 6/1998 | Bartholomew .............. | 43/57.1 |

* cited by examiner

Primary Examiner—Charles T. Jordan
Assistant Examiner—Jordan M. Lofdahl

(57) ABSTRACT

A fly harnessing and storage device, including a main body casing with an inner storage surface, are for attaching a plurality of fly hooks thereon. The casing also has an aperture through which a flexible tubular member passes. The tubular member harnesses tippets which extend from the fly hooks, into the casing aperture connected end of the tubular member and extending beyond the opposite end. The tubular member also holds a loop feeder which permits a user to eye the loop with a tippet and pull the feeder to secure the tippet through the tubular member.

10 Claims, 3 Drawing Sheets

FLY HARNESSING AND STORAGE DEVICE

BACKGROUND OF THE INVENTION

1. Field of the Invention

The present invention is directed to fishing hook storage devices and, more particularly, to fly storage devices to inhibit entanglements and to provide for ease of attachment to fishing line. The device includes a main body casing with a hook retaining surface for efficiently retaining a plurality of surplus fly hooks such that tippets extending from the fly hooks may be fed by a feeding member through a flexible tubular member and stored therein to prevent entanglement of the tippets and to permit easy removal and attachment of the same to fishing line.

2. Information Disclosure Statement

Conventional hook storage devices are presently available in a variety of configurations which permit storage of spare or surplus fishing hooks. However, no prior art device teaches a sealable main body casing with a hook retaining surface for efficiently retaining a plurality of surplus fly hooks such that the tippets extending from the fly hooks may be fed by a flexible looped feeding member through a flexible tubular member to facilitate improved storage and to prevent entanglement of the tippets and to further permit easy removal and attachment of the same to fishing line. The following patents describe the present state of the art with reference to hairholding devices.

U. S. Pat. No. 667,676 to Robert B. Cantrell describes an angler's book as does U.S. Pat. No. 940,132 to Samuel E. Creasey.

U.S. Pat. No. 1,900,035 to Henry M. Beck describes a fly holder which is attachable to a piece of clothing.

U.S. Pat. No. 2,525,057 to William F. Anderson describes a rigid, tubular, multiple shell holder and U.S. Pat. No. 2,530,292 to Arthur John Howard Crook describes a rigid, tubular hook to gut holder.

U.S. Pat. No. 2,540,340 to Ralph H.

Linblade and U.S. Pat. No. 3,638,843 to Samuel J. Ortynski describe various types of carriers for fishing flies.

U.S. Pat. No. 3,832,798 to Robert G. Pilston describes a container having an elongated tubular transparent housing which envelops a lure suspended therein by a line connectable to a fisherman via a buttonhole, belt, auxiliary chain or necklace, etc. When access to the lure is desired, an access closure which closes the bottom of the housing is removed and the housing is moved upward along the line to expose the lure and line connector. After separation of the lure from the connector, the housing returns by gravity to its initial position, stopped by an abutment on the line connector engaging the container. A multiple lure container is also disclosed which provides a plurality of transparent plastic tubes open at one end and formed into an integral body. A hinged plastic transparent cover extends over and closes the upper open ends of the tubes. A shoulder strap supports the container on the user. By this arrangement visual access is provided to the interiors of the tubes.

U.S. Pat. No. 4,437,258 to Gilbert Allard describes a fishing leader holder which consists of an outer cylindrical tube, an inner cylindrical tube rotatably mounted inside the outer tube, a longitudinal slot in each tube which can be mutually aligned, and a cylindrical inner securement part which can slide within the inner tube. The securement part has a radially extending projection which passes through the slots in the two tubes and, therefore, the securement part can slide longitudinally along the inner tube when the slots are mutually aligned. At one end of the slot in the outer tube, there is a short slot at right angles to the longitudinal slot so that when the securement part is at this one end of the slot, the inner tube can be rotated within the outer tube to both hold the securement part at one position and to cover the slot in the inner tube. A cap is fitted over the end of the inner tube which is adjacent to the short slot in the outer tube, and a resilient part is secured to the side of the cap facing the inside of the inner tube so that the securement part will be under the effect of the resilient part when its projection is within the short slot, so holding the securement part and the two tubes in their relative positions.

U.S. Pat. No. 4,516,707 to Joseph R. Crapanzano describes a portable container for supporting and displaying fishing plugs and lures in a well organized manner consisting of a housing having a partially removed section for viewing, a telescopic cover for said housing split into two sections hinged together along a single intermediate edge which telescopically slides into the housing, the upper section having a transparent window and is capable of being folded over when the cover at the hinged part reaches,the upper extremity of the housing. The bottom section slides back down over the housing while the upper section resides without the housing to form an angular support for the housing. There are securing members at the lower extremities of both the housing and telescopic cover to secure their parts while in transit.

A removable holder is carried by the housing which includes spaced apart mounting slots at both extremes for receiving and tensioning the plugs and lures to secure them to assure that they are not dislodged in transit, and to display them in an organized array for selection purposes.

U.S. Pat. No. 4,563,834 to Donald R. Spencer describes a fishing fly box which includes a cylindrical housing in which a spool is located, the spool being mounted to rotate on hollow spindles, that project inwardly from the end walls of the housing. The housing has an opening which is normally closed by a cover, but when the cover is open, flanges at the end of the spool are exposed where they may be easily manipulated to turn the spool. Strips of soft retaining material extend axially along the spool to retain the flies, for the hooks of the flies are easily embedded in these strips. The fly box is suspended from a lanyard, and to retrieve a fishing fly, the fisherman merely inserts a finger of his left hand into the spindle of the left end wall, and with the thumb of that hand moves the cover to its open position. Again using the thumb he turns the flange of the spool until the desired fly is at the opening, whereupon the fly is withdrawn. The fly box has an end cap, which is easily detached from the right end wall, and it encloses an annular cavity for storing leaders.

U.S. Pat. No. 5,337,511 to Millard G. Ashbaugh describes a carrier for fishing lures which includes a cylindrical tube having a plurality of holes along the side wall. A hook of a fishing lure may be inserted into any of the holes and positively retained when the carrier is in its normal substantially vertical position due to gravity. The shank of the lure hook will likewise depend downward to lie substantially parallel to the major axis of the cylindrical tube, and cannot be removed from the hole due to the abutting of the hook shank against the side of the tube. However, when the tube is swung to a horizontal position and twisted so the lure hook retaining holes face vertically upward, the hook shank will fall to a vertical position due to gravity to be perpendicular to the major axis of the tube. Due to the relatively small diameter of the tube, the hook may then be lifted from the retaining hole in the tube for use, or a lure may be installed for storage in the tube. The tube is suspended from a belt attachment loop, which loop is easily removable and installable on a belt. The present lure carrier is well suited for use in casual fishing outings of relatively short duration, where the carriage of extensive quantities of tackle and equipment are not desired.

U.S. Pat. No. 5,761,845 to Mark Bartholomew describes a fish hook lure and leader carrier which is formed from plastic. It has a basic configuration having a tubular structure with two caps, one on each end. The interior of the tubular structure houses the hooks and/or lures in the interior cavities. The leader extends through the slots in the interior cavity and wraps around the outside of the tubular structure. When the two caps are snapped onto the ends the leader is firmly in place. The interior cavity may contain a septum separating it into two cavities. These cavities may have end walls that occlude half the opening at each end of the tubular structure. The end walls are not opposite providing access to the two cavities.

Notwithstanding the prior art, the present invention is neither taught nor rendered obvious thereby.

SUMMARY OF THE INVENTION

A fly harnessing and storage device includes a main body casing with a hook retaining surface for efficiently retaining a plurality of surplus fly hooks such that tippets extending from the fly hooks may be fed by a feeding member through a tubular member to prevent damage to and entanglement of the tippets and to permit easy removal and attachment of the replacement fly hooks to fishing line. In some embodiment the tubular member is a flexible tubular member and preferably has a circular cross section configuration with out exceeding the scope of the present invention.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
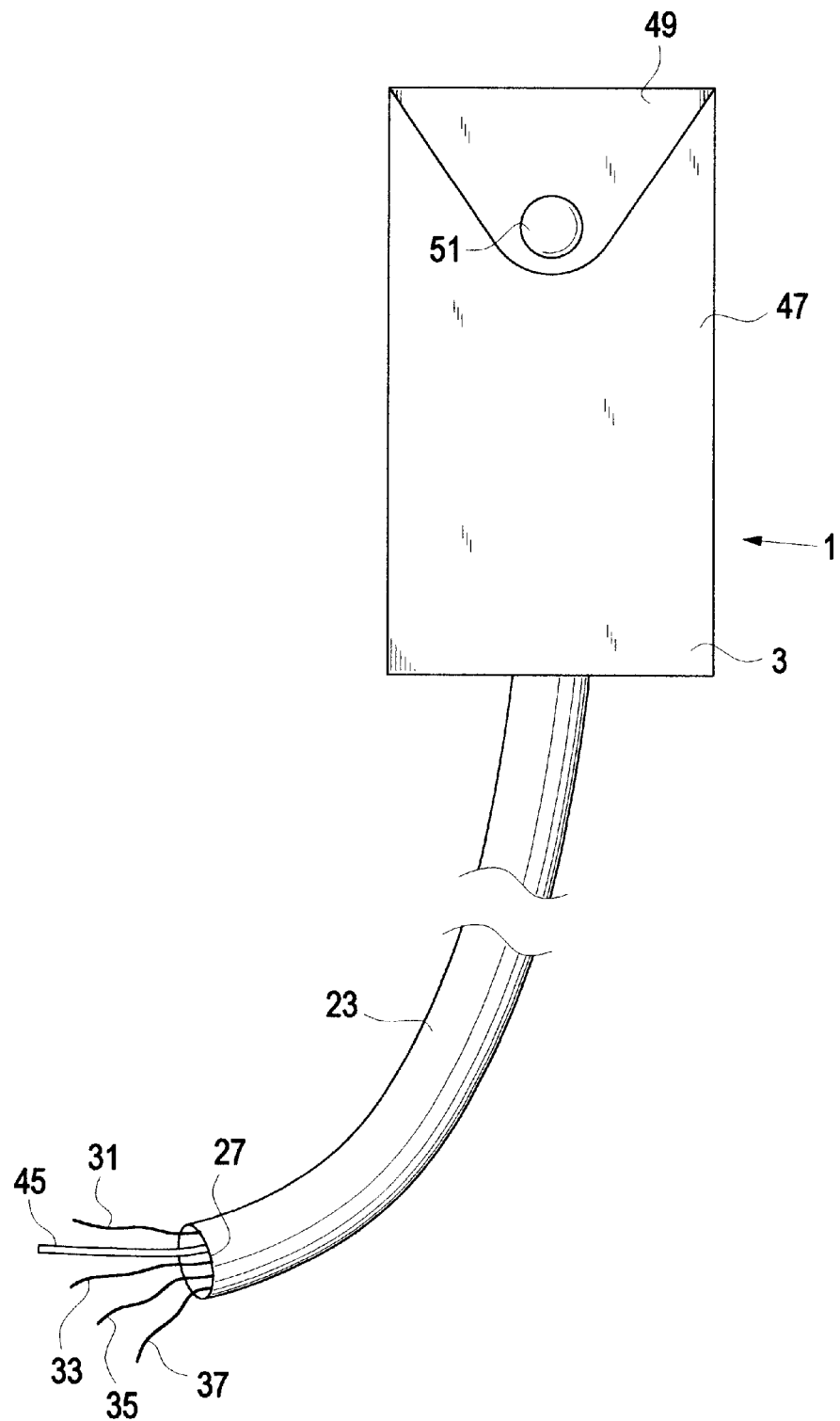
FIG. 1 shows a front view of a present invention device in its closed position.
Figure 2:
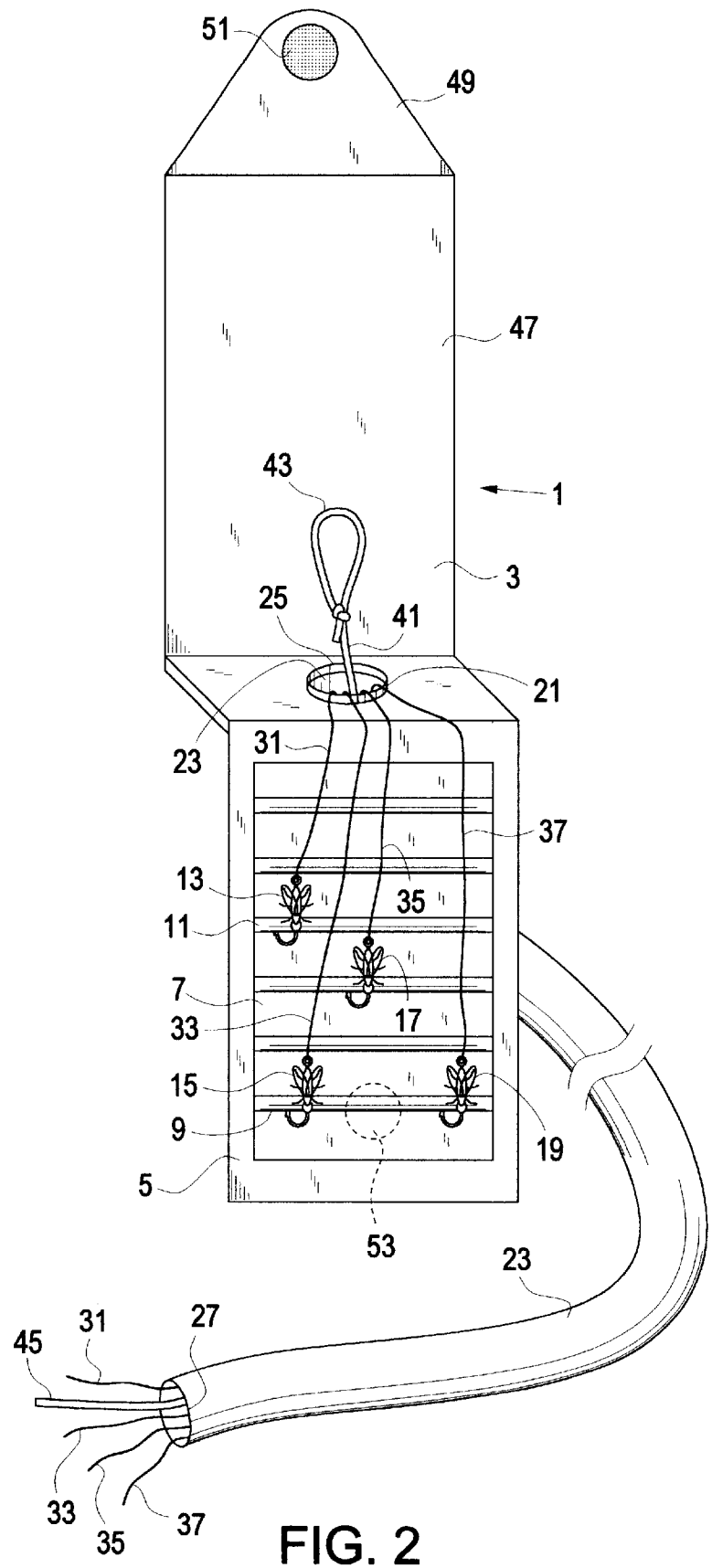
FIG. 2 shows a front open view of the present invention device of Figure.
Figure 3:
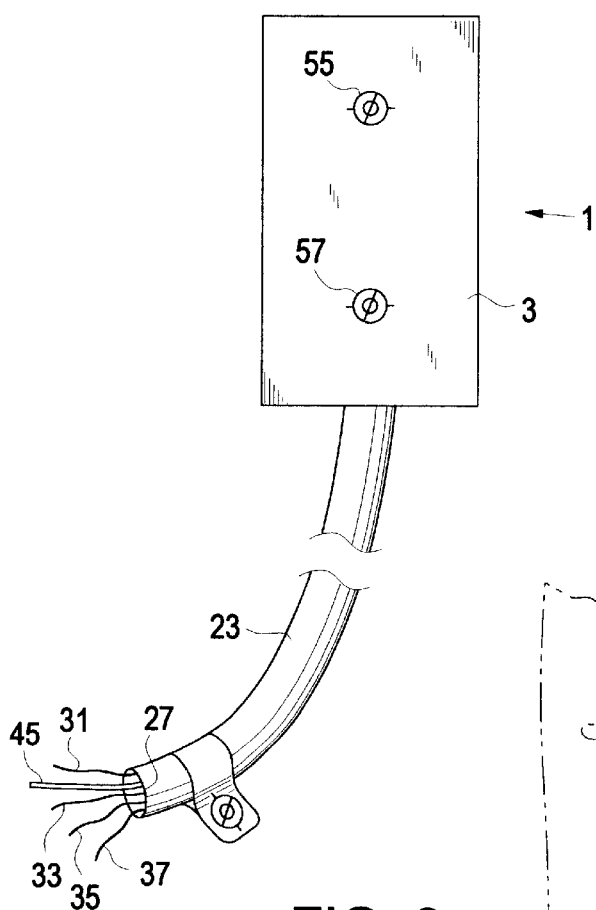
FIG. 3 shows a back view thereof.

FIG. 1 shows a present invention, a fly harnessing and storage device 1 in a front view, in its closed position. FIG. 2 shows the same device as FIG. 1, but in its open position. FIG. 3 shows a back closed view thereof with an optional feature added. These three figures are discussed collectively below. Present invention device 1 includes main body casing 3 which has an open position and closed position as illustrated by FIGS. 1 and 2 and main body casing 3 has an inner storage area 5 which is exposed when main body casing 3 is in its main position. The inner storage surface area 5 includes retaining means 7 which, in this case, is a synthetic semi-rigid foam pad with linear protrusions, such as protrusion 9 and 11 for attaching the midge-flies. (Alternatively, many other forms of inner storage surface areas may be used, e.g., flat foam, cloth, fur, cork, composites, of other existing or yet to be developed "hookable" materials.) Thus flies 13,15,17 and 19 are hooked into he protrusions as shown.

The main body casing 3 has a circular aperture 21 and has fixed therein a flexible tubular member 23, the flexible tubular member 23 having a first distal 25 and a second distal 27 and is connected to main body casing 3 at aperture 21. Tubular member 23 may be glued, force fitted, heat melded, stitched or by any other means recognized by an artisan. Tubular member 23 has a sufficient diameter to receive a plurality of tippets thereon, such as tippets 31, 33, 35 and 37.

There is also a looped feeder 41 which has a loop 43 at its top end and extends down through flexible tubular member 23 with distal end 45 exposed for gripping and pulling through a tippet for attachment to a fishing line.

Top flap 47 of main body casing 3 includes a top button flap 49 with button 51 for attachment to a fastening device 53 located on the back of inner storage area S. The button could be replaced by other fastening means and could be a Velcrog® attachment or other known fastener.

Referring specifically to FIG. 3, which shows a back view of a present invention 1, main body casing 3 has a fastening means such as snaps with pins, 55 and 57, for attachment to a shirt, vest, or other clothing. Optional strap 59 on distal end 27 of flexible tubular member 23 also includes a fastening device 61 so that a user may attach that end to a convenient location to main body casing 3.

Figure 4:
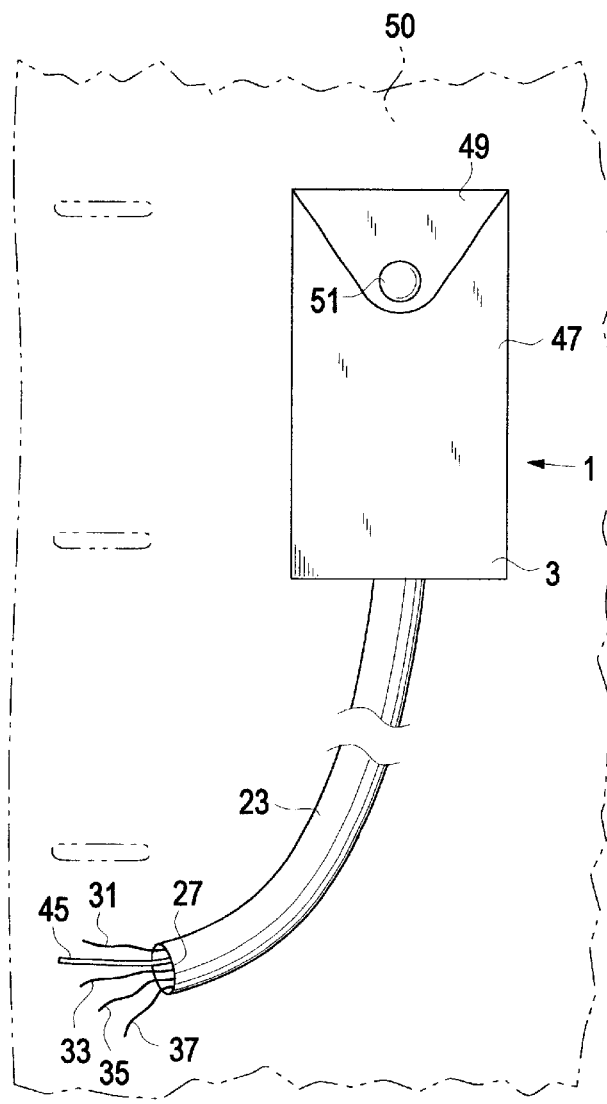
FIG. 4 in a front view of another embodiment of a present invention fly harnessing and storage device wherein it is an integral component of a vest.

Referring to FIG. 4, there is shown another embodiment of a:present invention device which is identical to that shown in FIG. 1 except that, in this embodiment, the device 1 is sewn onto a vest 50 (partial cut view). Otherwise, parts identical to those shown in FIG. 1 are identically numbered. Thus device 1 could be sewn onto the vest, riveted, adhered with adhesive, or otherwise permanently attached, or it could be removably attached.

Obviously, numerous modifications and variations of the present invention are possible in light of the above teachings. It is therefore understood that within the scope of the appended claims, the invention may be practiced otherwise than as specifically described herein. For example, the present invention device may be an integral part of another item without exceeding the scope of the present invention, such as a pocket or additional feature to a shirt or jacket or to a woven or synthetic fabric tackle box.

What is claimed is:

1. A fly harnessing and storage device comprising:
    (a) a main body casing, said main body casing having a first open position and a second closed position, said main body casing having an inner storage surface area exposable when said main body casing is in said first open position, said inner storage surface area having means for retaining a plurality of hooks thereon, said main body casing having an aperture for permitting the insertion of tippets extending from said plurality of hooks therethrough;
    (b) a tubular member, said tubular member having first and second distal ends wherein said first distal end is connected to said aperture, said tubular member having adequate dimension to retain said tippets therein; and
    (c) looped feeder means for feeding said tippets through said aperture and through said tubular member for engendering secure storage of said tippets therein.

2. The fly harnessing and storage device according to claim 1 wherein said fly harnessing and storage device includes means for attaching said fly harnessing and storage device to an outer clothing surface.

3. The fly harnessing and storage device according to claim 1 wherein said inner storage surface area means includes an expanse of foam rubber attached to said main body casing, said foam rubber being adapted to receive and retain said plurality of hooks thereon.

4. The fly harnessing and storage device according to claim 1 wherein said looped feeder means includes a first section defined by an elongated flexible strand having a distal end and a second section defined by a flexible loop opposite said distal end of said flexible strand, said flexible loop being capable of grasping one or more of said tippets to enable the feeding of said tippets through said aperture and through said tubular member by passing through said aperture and through said tubular member, said looped feeder being capable of storage within said fly harnessing and storage device such that said flexible loop is retained adjoining said aperture and said elongated flexible strand extends through said tubular member and said flexible strand distal end extends from said second distal end of said tubular member.

5. The fly harnessing and storage device according to claim 1 wherein said fly harnessing and storage device includes means for fastening said fly harnessing and storage device in said second closed position.

6. The fly harnessing and storage device according to claim 1 wherein said fly harnessing and storage device is rectangularly shaped.

7. The fly harnessing and storage device of claim 1 wherein said tubular member is a flexible tubular member.

8. The fly harnessing and storage device of claim 1 wherein said inner storage surface area includes linear protrusions for inserting hooks therein.

9. The fly harnessing and storage device of claim 1 wherein said device further includes fastening means on a back portion of said main body casing for attached to flexible, piercable material.

10. The fly harnessing and storage device of claim 1 wherein said inner surface storage area is adapted to receive midge-fly hooks.

* * * * *